United States Patent
Barnes-Davin et al.

(10) Patent No.: US 11,230,496 B2
(45) Date of Patent: Jan. 25, 2022

(54) CONSTRUCTION MATERIAL PREPARED FROM A NEW POZZOLANIC MATERIAL

(71) Applicant: VICAT, Paris la Defense (FR)

(72) Inventors: Laury Barnes-Davin, Voiron (FR); Olivier Martinage, Lyons (FR); Eric Mathieu, Bourgoin-Jallieu (FR)

(73) Assignee: VICAT, Paris la Defense (FR)

( * ) Notice: Subject to any disclaimer, the term of this patent is extended or adjusted under 35 U.S.C. 154(b) by 122 days.

(21) Appl. No.: 16/630,640

(22) PCT Filed: Jul. 10, 2018

(86) PCT No.: PCT/FR2018/051729
§ 371 (c)(1),
(2) Date: Jan. 13, 2020

(87) PCT Pub. No.: WO2019/012218
PCT Pub. Date: Jan. 17, 2019

(65) Prior Publication Data
US 2020/0157003 A1 May 21, 2020

(30) Foreign Application Priority Data
Jul. 11, 2017 (FR) .................................... 17/56541

(51) Int. Cl.
*C04B 22/00* (2006.01)
*C04B 28/00* (2006.01)
*C04B 28/04* (2006.01)
*C04B 103/00* (2006.01)
*C04B 111/00* (2006.01)

(52) U.S. Cl.
CPC ........ *C04B 22/0093* (2013.01); *C04B 28/006* (2013.01); *C04B 28/04* (2013.01); *C04B 2103/0088* (2013.01); *C04B 2111/00215* (2013.01)

(58) Field of Classification Search
CPC ... C04B 22/0093; C04B 28/006; C04B 28/04; C04B 2103/0088; C04B 2111/00215; C04B 7/24; C04B 7/32; C04B 14/041; C04B 14/303; C04B 20/008; C04B 28/26; Y02P 40/10
See application file for complete search history.

(56) References Cited

U.S. PATENT DOCUMENTS 4,366,255 A   12/1982   Lankard

FOREIGN PATENT DOCUMENTS

| CN | 101412596 A | 4/2009 |
|---|---|---|
| CN | 102249582 A | 11/2011 |
| EP | 0 199 941 A2 | 11/1986 |
| EP | 0 709 354 A1 | 5/1996 |
| GB | 931 207 A | 7/1963 |
| WO | 90/03957 A1 | 4/1990 |

OTHER PUBLICATIONS

Safarian et al "Smelting-Reduction of Bauxite for Sustainable Alumina Production", 2016 Sustainable Industrial Processing Summit and Exhibition vol. 5: Starkey Intl. Syrop./ Mineral Processing pp. 149-158. (Year: 2016).*
Nov. 7, 2018 Written Opinion of the International Searching Authority issued in International Patent Application No. PCT/FR2018/051729.
Nov. 7, 2018 Search Report issued in International Patent Application No. PCT/FR2018/051729.

* cited by examiner

*Primary Examiner* — Anthony J Green
(74) *Attorney, Agent, or Firm* — Oliff PLC

(57) ABSTRACT

A new construction material prepared from a new pozzolanic material.

14 Claims, No Drawings

CONSTRUCTION MATERIAL PREPARED FROM A NEW POZZOLANIC MATERIAL

The present invention relates to a new construction material prepared from a new pozzolanic material.

The manufacture of hydraulic binders, and in particular that of cements, essentially consists in calcining a mixture of carefully selected and dosed raw materials, also called «raw-mix». The cooking of this raw-mix gives an intermediate product, the clinker, which, crushed with possible mineral additions, will give cement. The type of manufactured cement depends on the nature and proportions of the raw materials as well as the cooking method. There are several types of cements: Portland cements (which represent most of cements produced in the world), aluminous cements (or calcium aluminate), natural quick setting cements, sulfo-aluminous cements, sulfo-belitic cements and other intermediate varieties.

The most common cements are Portland cements (CEM I). Portland cements are obtained from Portland clinker, obtained after clinkering at a temperature in the range of 1450° C. from a raw-mix rich in calcium carbonate in a furnace. The production of one ton of Portland cement is accompanied by the emission of very large amounts of $CO_2$ (about 0.8 to 0.9 tons of $CO_2$ per ton of cement).

Yet, in 2014, the amount of cement sold around the world was around 4.2 billion tons (source: French Trade Union for the Cement Industry—SFIC). This figure, which is constantly increasing, has more than doubled in 15 years. The cement industry is therefore today looking for a valid alternative to Portland cement, that is to say cements having at least the same strength and quality features as Portland cements, but which, during their production, emit less $CO_2$.

During the production of clinker, the main constituent of Portland cement, the release of $CO_2$ is linked to:
- up to 40% for heating the cement kiln, in crushing and in transport;
- up to 60% of so-called chemical, or of decarbonation $CO_2$.

Decarbonation is a chemical reaction that takes place when limestone, the main raw material for making Portland cement, is heated at high temperature. The limestone is then transformed into quick lime and $CO_2$ according to the following chemical reaction:

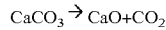

$$CaCO_3 \rightarrow CaO+CO_2$$

To reduce the $CO_2$ emissions related to the production of Portland cement, several approaches have been considered so far:
- adapting or modernizing cement processes in order to maximize the efficiency of heat exchanges;
- developing new «low carbon» binders such as sulfo-aluminous cements prepared from raw materials less rich in limestone and at a lower cooking temperature, which enables a reduction in $CO_2$ emissions of about 35%;
- or even more (partial) substituting clinker in cements with materials allowing to limit $CO_2$ emissions.

Among the above approaches, that of the (partial) substitution of clinker in cements has been the subject of many developments. Two ways were mainly explored: the substitution of clinker by limestone filler and the substitution of clinker by so-called «pozzolanic» materials The substitution of clinker by limestone filler (that is to say an inactive material) mainly has a diluting effect and is accompanied by a significant drop in resistance, which is very problematic.

However, the substitution of clinker by active or «pozzolanic» materials is accompanied by a much lesser decrease in resistances and for some of them by an increase in these.

A pozzolanic material generally designates any material having «pozzolanic properties», that is to say capable of combining at room temperature and in the presence of water with lime or Portlandite formed during the hydration of the cement to give hydrates with very little solubility likely to generate additional resistance in the long term.

Portland cement is mainly constituted by two types of anhydrous phases: calcium silicates ($C_3S$ and $C_2S$—in which C represents CaO and S represents $SiO_2$) and calcium aluminates ($C_2A$ and $C_4AF$—in which C represents CaO, A represents $Al_2O_3$ and F represents $Fe_2O_3$). It also contains free lime in small amounts.

It is the hydration of the silicate phases which generates the resistances through the formation of hydrates of the gel type: hydrated calcium silicates C—S—H according to the following equations (unbalanced):

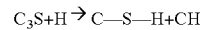

$$C_3S+H \rightarrow C—S—H+CH$$

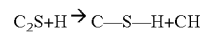

$$C_2S+H \rightarrow C—S—H+CH$$

in which C represents CaO, S represents $SiO_2$ and H represents $H_2O$.

Portlandite «CH» is a co-product of the hydration of calcium silicates. It represents between 15 and 20 weight % of completely hydrated cement in the case of a CEM I and does not contribute to the resistances.

The pozzolanic material is a source of amorphous and highly reactive silica and/or alumina. When mixed with cement, it will react with portlandite to form new hydrates:

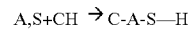

$$A,S+CH \rightarrow C\text{-}A\text{-}S—H$$

in which A represents $Al_2O_3$, C represents CaO, S represents $SiO_2$ and H represents $H_2O$.

The pozzolanic reaction, slower and later, therefore enables the consumption of portlandite which does not provide resistance to form secondary or late C—S—H generally richer in alumina than C—S—H derived from silicates, generally noted C-A-S—H for this reason. Like C—S—H, C-A-S—H are barely crystallized, or not at all, hydrates which close the porosity and generate an increase in resistance in the longer term.

At the date of the present invention, different pozzolanic materials are used:
- the so-called «natural» pozzolans which are volcanic rocks rich in naturally amorphous silica and alumina;
- fly ash derived from the production of electricity in coal-fired power plants and essentially constituted by silica, alumina and iron oxide;
- silica smoke originating from the reduction of quartz by carbon during the production of silicon and iron/silicon alloys;
- blast-furnace slag, obtained in the steel industry during the production of cast iron, almost entirely amorphous, constituted by silica, alumina but also calcium and magnesium oxide; and
- calcined clays which are synthetic pozzolans obtained by the calcination at 600° C. of kaolinic clays.

Nevertheless, the pozzolanicity of these materials remains variable, and the resistance of construction materials prepared from these pozzolanic materials is sometimes significantly lower than that of construction materials prepared from conventional Portland cements. It therefore remains interesting to identify new pozzolanic materials enabling the preparation of construction materials having a resistance in the medium and long term comparable to that of construction materials prepared from Portland cements, while significantly limiting $CO_2$ emissions during their preparation.

Bauxite is a laterite rock rich in aluminum, in particular in aluminum oxides and hydroxides:
- boehmite: $\gamma$-AlO(OH)
- gibbsite: $\gamma$-Al(OH)$_3$;
- bayerite: $\alpha$-Al(OH)$_3$;
- diaspore: $\alpha$-AlO(OH); and
- corundum: $\alpha$-Al$_2$O$_3$.

Bauxite may also contain:
- iron, in particular iron oxides and hydroxides:
- goethite: $\alpha$-FeO(OH); and
- hematite: $\alpha$-Fe$_2$O$_3$.
- and/or kaolinite Al$_2$Si$_2$O$_5$(OH)$_4$ (or AS$_2$H$_2$ in which A represents Al$_2$O$_3$, S represents SiO$_2$ and H represents H$_2$O) in association with gibbsite or boehmite.

Bauxite is mainly used for the production of aluminum using the Bayer method (developed in 1887). Nevertheless, in this method only bauxites very rich in aluminum, and therefore with few impurities (iron oxide (hematite, goethite) and kaolinite), are used. Conversely, bauxites that are too rich in iron and/or silica located on the roof or on the wall of bauxite veins cannot be used in this method and are often discarded.

Yet, it has now been found quite surprisingly that bauxites rich in iron and/or silica, once calcined at low temperature (eg 700° C.) could be used as a pozzolanic material in construction materials, which have a resistance in the medium and long term comparable to that of construction materials prepared from conventional Portland cements, and can be prepared while significantly limiting $CO_2$ emissions. Furthermore, these construction materials have distinctive technical features in comparison with construction materials already known, in particular those prepared from already known pozzolanic materials.

Thus, the present invention relates to a construction material in the form of a powder containing at least 1.5% of CaO and in which 1% to 80% of the particles having a diameter smaller than or equal to 150 μm contain:
- at least 25% of Al$_2$O$_3$;
- less than 60% of CaO; and
- at least 5% of SiO$_2$, the SiO$_2$/Al$_2$O$_3$ weight ratio being less than 1.2.

The construction material according to the present invention, prepared from bauxite rich in iron and/or silica calcined at low temperature (eg 700° C.) has a short, medium and long term resistance comparable to that of the construction materials prepared from conventional Portland cements, and can be prepared while significantly limiting $CO_2$ emissions.

In the context of the present invention:
- the term «construction material» means a cement, a concrete, a mortar or a geopolymer;
- the term «geopolymer» means any alkaline aluminosilicate material, alkali-activated material or inorganic polymer, obtained by the reaction of an aluminosilicate precursor and an activation solution constituted by a sodium or potassium silicate and sodium hydroxide or potassium hydroxide, or phosphoric acid. The activation solution allows dissolving the aluminosilicate precursor into aluminate and silicate monomers which polycondensate into an inorganic material;
- the term «bauxite» means any natural mineral material rich in alumina and capable of further containing iron oxides and hydroxides, kaolinite and/or quartz;
- the term «pozzolanic material» means any material having pozzolanic properties within the meaning of European standard NF EN 197-1, that is to say adapted to be combined at room temperature and in the presence of water with lime or Portlandite formed during the hydration of the cement to give very poorly soluble hydrates capable of generating additional resistance in the long term; and
- the term «geopolymer precursor» means any material capable of being dissolved by an activation solution constituted by a sodium or potassium silicate and sodium hydroxide or potassium hydroxide, or phosphoric acid, into aluminate and silicate monomers which can lead to a geopolymer by polycondensation. Among the examples of such precursors, mention may in particular be made of metakaolin, fly ash or slag.

In the context of the present invention, the median diameter or d50 corresponds to the diameter below which 50% of the total weight of the particles of the considered sample is found. This may be determined by any method known to those skilled in the art, in particular by laser granulometry in dry or wet route.

In the context of the present invention, the diameter of the particles may be determined by any method known to those skilled in the art, in particular by scanning electron microscopy, morphogranulometry or by laser granulometry.

Finally, in the context of the present invention, the proportions expressed in % correspond to weight percentages with respect to the total weight of the considered entity.

The present invention therefore relates to a construction material in powder form in which 1% to 80% of the particles having a diameter smaller than or equal to 150 μm have the chemical features described above. Preferably, the present invention relates to a construction material as previously defined in which the following features are selected alone or in combination:
- the construction material comprises at least 3% of CaO, preferably at least 5% of CaO, more preferably at least 10% of CaO;
- the proportion of the considered particles is from 1% to 70%, preferably 1% to 60%, more preferably 1% to 50%;
- the diameter of the considered particles is smaller than or equal to 120 μm, preferably smaller than or equal to 100 μm, more preferably smaller than or equal to 90 μm;
- the considered particles contain at least 30% of Al$_2$O$_3$, preferably at least 35% of Al$_2$O$_3$;
- the considered particles contain at most 50% of CaO, more preferably from 1% to 50% of CaO, quite preferably from 1% to 45% of CaO;
- the considered particles contain SiO$_2$, the SiO$_2$/Al$_2$O$_3$ weight ratio being less than 1, preferably less than 0.8;
- the considered particles contain at least 10% of SiO$_2$, preferably at least 15% of SiO$_2$;
- the considered particles further contain up to 20% Fe$_2$O$_3$; and or
- the considered particles further contain up to 5% of TiO$_2$.

The construction material according to the present invention is therefore prepared from bauxite rich in iron and/or silica calcined at low temperature.

The bauxite used in the context of the present invention contains (before calcination):
- from 10% to 85% of Al$_2$O$_3$;
- from 5% to 40% of SiO$_2$;
- from 0% to 30% CaO;
- from 0% to 20% of Fe$_2$O$_3$; and
- from 0% to 5% of TiO$_2$.

Afterwards, the bauxite previously described is calcined at low temperature according to the following method:

drying and then crushing the bauxite until reaching a median diameter smaller than 25 μm;

calcinating the obtained material at a temperature between 500 and 800° C. using a rotary or flash calciner for 1 second (flash) to 1 hour (rotary); and possible deagglomeration, for example by crushing.

The chemical composition of the bauxite thus calcined is modified, this one comprising:

from 10% to 95% of $Al_2O_3$;
from 5% to 50% of $SiO_2$;
from 0% to 35% of CaO;
from 0% to 25% of $Fe_2O_3$; and
from 0% to 8% of $TiO_2$.

The calcined bauxite described hereinabove can then be used as a pozzolanic material to prepare the construction materials according to the invention. To do so, those skilled in the art can use any known method for preparing a cement, a concrete, a mortar or a geopolymer.

In the context of the present invention, the previously described calcined bauxites are therefore used for the first time as a pozzolanic material or as a geopolymer precursor.

Although the pozzolanic material according to the present invention is preferably obtained from a calcined bauxite, it can also be obtained from any material having the same chemical composition as the calcined bauxite. Thus, the present invention also relates to the use of a material, in particular a calcined bauxite, comprising:

from 10% to 95% of $Al_2O_3$;
from 5% to 50% of $SiO_2$;
from 0% to 35% of CaO;
from 0% to 25% of $Fe_2O_3$; and
from 0% to 8% of $TiO_2$;

as a pozzolanic material or geopolymer precursor, said pozzolanic material or geopolymer precursor which can in particular be used for the preparation of a construction material as previously described.

The present invention may be illustrated without limitation by the following examples.

EXAMPLE 1—CALCINATION OF BAUXITE

A bauxite having the chemical composition reported in the following Table 1 is used:

TABLE 1

Chemical composition of bauxite before calcination

| $SiO_2$ | $Al_2O_3$ | CaO | MgO | $Fe_2O_3$ | $TiO_2$ | $K_2O$ | $P_2O_5$ | $Mn_2O_3$ | Loss on ignition |
|---|---|---|---|---|---|---|---|---|---|
| 26.7% | 37.7% | 0.5% | 0.2% | 21.0% | 1.6% | 0.2% | 0.2% | 0.1% | 11.8% |

The bauxite described hereinabove is dried for 24 hours at 105° C. and then crushed in a ring roll mill to a median diameter of 25 μm. The powder thus prepared is cooked in a laboratory furnace in batches of 200 g at 600° C. or 700° C. as the case may be for 1 hour with hot charging and drawing. Afterwards, the calcined bauxite thus obtained is again crushed slightly in a ring roll mill (15 seconds, 700 rpm) to deagglomerate it.

Bauxite calcined at 600° C. (hereinafter Bx-1) is analyzed. The chemical composition thereof is reported in Table 2 hereinbelow:

TABLE 2

Chemical composition of bauxite calcined at 600° C. - Bx-1

| $SiO_2$ | $Al_2O_3$ | CaO | MgO | $Fe_2O_3$ | $TiO_2$ | $K_2O$ | $P_2O_5$ | $Mn_2O_3$ | Loss on ignition |
|---|---|---|---|---|---|---|---|---|---|
| 31.0% | 42.1% | 0.2% | 0.2% | 20.9% | 1.8% | 0.3% | 0.2% | 0.1% | 3.2% |

Likewise, bauxite calcined at 700° C. (hereinafter Bx-2) is analyzed. The chemical composition thereof is reported in Table 3 hereinbelow:

TABLE 3

Chemical composition of bauxite calcined at 700° C. - Bx-2

| $SiO_2$ | $Al_2O_3$ | CaO | MgO | $Fe_2O_3$ | $TiO_2$ | $K_2O$ | $P_2O_5$ | $Mn_2O_3$ | Loss on ignition |
|---|---|---|---|---|---|---|---|---|---|
| 31.1% | 43.1% | 0.1% | 0.2% | 21.3% | 1.9% | 0.3% | 0.2% | 0.1% | 1.7% |

EXAMPLE 2—ANALYSIS OF THE COMPOSITION OF A CONSTRUCTION MATERIAL PREPARED FROM BX-1

Cement 1 Preparation

A cement 1 is prepared by mixing 75% of a Portland cement CEM I 52.5 R according to standard EN 196-1 and 25% of calcined bauxite Bx-1.

Characterization by SEM Coupled to an EDAX Probe

Cement 1 was sieved to 150 µm, then the undersize was analyzed by scanning electron microscopy (SEM) coupled to an EDAX probe (X-ray fluorescence emission spectrum) according to the following protocol.

The 150 µm undersize is included in resin in order to obtain a block in which the particles are dispersed. Afterwards, this block is progressively polished so as to obtain a mirror surface which reveals a large number of particle sections.

After metallization with carbon, this phase is observed using a scanning electron microscopy. It is thus possible to distinguish the different types of particles by their color (gray level) and their shape.

The EDAX probe coupled to the electron microscope makes it possible to determine the chemical composition locally and is used in two ways:
- for a «point-in-time» approach, an average measurement is made over the entire section of a particle; and
- for a statistical approach, a scan of the entire image (or mapping) is carried out enabling a chemical analysis of each pixel of the image. The software will then make it possible to visualize very clearly the richest in alumina or poorest in calcium areas. The software also makes it possible to group together the pixels having a similar chemistry and thus define areas of identical chemistry. This mapping not only allows determining the chemistry of the composition but also the percentage of pixels that the area represents in the image.

This approach based on image analysis to characterize a true property for spherical particles is conventionally used in the technical field of the invention.

Results

The mapping described hereinabove made it possible to obtain the results reported in the following Table 4.

TABLE 4

| Identified area | % of pixels | $Al_2O_3$ (in % w/w) | $SiO_2$ (in % w/w) | CaO (in % w/w) |
|---|---|---|---|---|
| 1 | 2% | 3.59 | 5.40 | 41.34 |
| 2 | 6% | 23.24 | 26.89 | 30.78 |
| 3 | 8% | 19.57 | 23.19 | 16.01 |
| 4 | 3% | 17.09 | 14.15 | 0.69 |
| 5 | 0% | 3.70 | 36.02 | 3.80 |
| 6 | 6% | 17.50 | 13.10 | 19.92 |
| 7 | 5% | 33.76 | 27.91 | 2.14 |
| 8 | 14% | 43.82 | 45.58 | 1.10 |
| 9 | 16% | 4.27 | 19.00 | 68.33 |
| 10 | 5% | 31.96 | 29.58 | 12.83 |
| 11 | 13% | 11.36 | 17.93 | 52.21 |
| 12 | 8% | 53.64 | 35.17 | 0.67 |
| 13 | 6% | 12.88 | 30.68 | 22.02 |
| 14 | 9% | 11.63 | 17.78 | 37.70 |

In cement 1, 32% of particles with a diameter of less than 150 µm contain
at least 25% $Al_2O_3$;
less than 60% of CaO; and
at least 5% of $SiO_2$;
and the $SiO_2/Al_2O_3$ weight ratio is less than 1.

EXAMPLE 2—MORTAR COMPOSITIONS

Preparation of Mortars 1 to 7

A reference mortar (hereinafter Mortar 1) is prepared from Portland cement CEM I 52.5 R according to standard EN 196-1. The composition of mortar 1 is as follows:
450 g of CEM I 52.5 R cement;
1350 g of standardized sand; and
225 g of water.

Similarly, mortars 2 to 7 are prepared from a 75% mixture of CEM I 52.5 R with respectively:
25% of Bx-1 (mortar 2);
25% of Bx-2 (mortar 3);
25% of limestone filler from St Hilaire (mortar 4);
25% of commercial calcined clay (Argicem®) (mortar 5);
25% of fly ash (mortar 6); and
25% of ground blast-furnace slag (mortar 7);
the other ingredients and their proportions remaining unchanged.

Mechanical Strength

The mechanical strength of the mortars is measured in accordance with standard EN 196-1 on prismatic mortar test specimens 4×4×16 cm3 prepared at 20° C.

The activity index characterizes the performance of the pozzolanic material when it is used at 25% substitution. It is defined as the ratio of the compressive strengths (measured as indicated hereinabove) of a cement mortar constituted by 75% of a reference cement (CEM I) and 25% of the considered pozzolanic addition, and of a mortar prepared with 100% of reference cement.

$$AI\ (\%) = \frac{CS\ \text{cement substituted at 25\%}}{CS\ \text{Reference}}$$

The results of the compressive strength (CS) measurements are reported in the following Table 5.

TABLE 5

| | | Mortar 1 (ref.) | Mortar 2 (Bx-1) | Mortar 3 (Bx-2) | Mortar 4 (Filler) | Mortar 5 (Argicem) | Mortar 6 (Fly ash) | Mortar 7 (Slag) |
|---|---|---|---|---|---|---|---|---|
| Compressive strength (MPa) | 2 days | 46.6 | 34 | 33.7 | 33.9 | 31.5 | 35.3 | 32.2 |
| | 7 days | 55.9 | 48.6 | 51.1 | 42.2 | 45.9 | 44.8 | 43.7 |
| | 28 days | 60.5 | 58.9 | 61.4 | 47.8 | 54.6 | 51.5 | 53.2 |
| Activity index | 2 days | — | 73.0% | 72.3% | 72.7% | 67.6% | 75.8% | 69.1% |
| | 7 days | — | 86.9% | 91.4% | 75.5% | 82.1% | 80.1% | 82.1% |
| | 28 days | — | 97.4% | 101.5% | 79.0% | 90.2% | 85.1% | 87.9% |

It appears that the mortars prepared from a Portland cement/calcined bauxite mixture (mortars 2 and 3) have a mechanical strength comparable to that of the mortar prepared from Portland cement alone (mortar 1) and a much better mechanical strength than the mortars prepared from conventional pozzolanic additions (mortars 5 to 7) or from filler-type additions (mortar 4).

EXAMPLE 3—MORTAR COMPOSITIONS

Preparation of Mortars 8 to 12

As in Example 2, mortars 6 to 10 are prepared from a CEM I 52.5 R/Bx-2 mixture in the following proportions:
90/10 (mortar 8);
80/20 (mortar 9);
70/30 (mortar 10);
60/40 (mortar 11); and
50/50 (mortar 12);
the other ingredients and their proportions remaining unchanged.

Mechanical Strength

The mechanical strength of the mortars is measured on prismatic mortar test specimens 4×4×16 cm3 prepared at 20° C. according to standard EN 196-1.

The performance index of the material may be defined in a way comparable to the activity index but for a substitution rate different from 25%. In this case, this index is defined as the ratio of the compressive strengths (measured as indicated hereinabove) of a cement mortar constituted by (100−X) % of a reference cement (CEM I) and X % of the considered pozzolanic addition, and by a mortar prepared with 100% of reference cement.

$$PI\ (\%) = \frac{CS\ \text{cement substituted at } X\ \%}{CS\ \text{Reference}}$$

The results of the compressive strength (CS) measurements are reported in the following Table 6.

TABLE 5

|  |  | Mortar 1 (ref.) | Mortar 8 | Mortar 9 | Mortar 10 | Mortar 11 | Mortar 12 |
|---|---|---|---|---|---|---|---|
| Compressive | 2 days | 40.2 | 34.9 | 32.2 | 29.7 | 22.6 | 16.4 |
| strength | 7 days | 51.6 | 52.6 | 53.1 | 48.5 | 40.2 | 31.8 |
| (MPa) | 28 days | 60.5 | 65.0 | 63.5 | 61.7 | 56.8 | 50.1 |
| Performance | 2 days | — | 86.8% | 80.1% | 73.8% | 56.2% | 40.8% |
| index (PI) | 7 days | — | 101.9% | 102.8% | 94.0% | 77.9% | 61.6% |
|  | 28 days | — | 106.7% | 104.3% | 101.2% | 93.3% | 82.3% |

It appears that the mortars prepared from a Portland cement/calcined bauxite mixture in proportions varying from 90/10 to 70/30 (mortars 6 to 8) have a mechanical strength comparable to or even greater than that of the mortar prepared from only Portland cement (mortar 1). Furthermore, the mortars containing large proportions of calcined bauxite in place of Portland cement (mortars 9 and 10) have a resistance at least comparable to that of the mortars prepared from conventional pozzolanic additions but in much lower proportions (mortars 5 to 7—example 2).

EXAMPLE 4—CONCRETE COMPOSITIONS

Preparation of Concretes 1 and 2

A reference concrete (hereinafter Concrete 1) is prepared from a Portland cement CEM I 52.5 R. The composition of concrete 1 is as follows:

12.3 kg of CEM I 52.5 R cement;
28.9 kg of aggregates 0-4 mm;
13.6 kg of aggregates 4-11 mm;
22.6 kg of aggregates 11-22 mm; and
6.8 kg of mixing water ($E_{eff}/C=0.50$).

Similarly, a concrete 2 is prepared from a Portland cement mixture CEM I 52.5 R/Bx-2 in a 85/15 proportion, the other ingredients and their proportions remaining unchanged.

Mechanical Strength

The mechanical strength of the concretes is measured on cylindrical concrete proof bodies (diameter 16 cm, height 32 cm) according to standard NF EN 12390-3.

The performance index of a pozzolanic material in a concrete may be defined as the ratio of the compressive strength (measured as indicated hereinabove) of two concretes formulated according to the same concrete formula, one being prepared from a cement constituted by reference cement substituted at X % by the pozzolanic material, and the other being prepared from a cement constituted by 100% of said reference cement.

$$PI\ (\%) = \frac{CS\ \text{concrete prepared with cement substituted at } X\ \%}{CS\ \text{concrete prepared with the reference cement alone}}$$

The results of the compressive strength (CS) measurements are reported in the following Table 7.

TABLE 7

|  |  | Concrete 1 (ref.) | Concrete 2 (15% Bx-2) |
|---|---|---|---|
| Compressive | 2 days | 29.9 | 25.2 |
| strength | 7 days | 42.4 | 41.6 |
| (MPa) | 28 days | 49.4 | 51.6 |

TABLE 7-continued

|  |  | Concrete 1 (ref.) | Concrete 2 (15% Bx-2) |
|---|---|---|---|
| Performance | 2 days | — | 84.3% |
| Index (PI) | 7 days | — | 98.1% |
|  | 28 days | — | 104.5% |

It appears that the concrete prepared from a Portland cement/calcined bauxite mixture (concrete 2) has a mechanical strength comparable to or even greater than that of the concrete prepared from Portland cement alone (concrete 1) after 7 days.

EXAMPLE 5—GEOPOLYMER COMPOSITIONS

Preparation of Geopolymers

A geopolymer 1 is prepared from metakaolin (Argicem®) and an activating solution constituted by 80 weight % of sodium silicate, 10 weight % of soda and 10 weight % of water. Geopolymer 1 is formulated from 100 g of metakaolin Argicem® and 100 ml of activating solution.

Similarly, a geopolymer 2 is prepared from Bx-2 (instead of metakaolin), the other ingredients and their proportions remaining unchanged.

Mechanical Strength

The mechanical strength of the geopolymers is measured on geopolymer dough cubes with dimensions 20×20 mm. The cubes are made in steel molds and then stored for 24 hours at 20° C. and 100% humidity. After demolding, the cubes are stored for 5 additional days at 20° C. in sealed bags containing a bottom of water in order to keep them at 100% humidity without completely immersing them.

The strength of the obtained samples is tested at 6 days

The maximum strengths of this type of material are reached in less than one week.

At 6 days, the geopolymer 1 leads to a compressive strength (CS) of 37 MPa while the geopolymer 2 leads to a compressive strength (CS) of 68 MPa, or almost the double.

The use of calcined bauxite as a geopolymer precursor therefore makes it possible to produce particularly high-performance geopolymers, which further have at 6 days strengths comparable to those of CEM I cement at 28 days.

The invention claimed is:

1. A construction material in the form of a powder containing at least 1.5% of CaO and in which 1% to 80% of the particles having a diameter smaller than or equal to 150 µm contain:
    at least 25% of $Al_2O_3$;
    less than 60% of CaO; and
    at least 5% of $SiO_2$, the $SiO_2/Al_2O_3$ weight ratio being less than 1.2.

2. The construction material according to claim 1 wherein it contains at least 3% of CaO.

3. The construction material according to claim 1, wherein the proportion of the particles having a diameter smaller than or equal to 150 µm is from 1% to 60%.

4. The construction material according to claim 1, wherein the diameter of the particles having a diameter smaller than or equal to 150 µm is smaller than or equal to 100 µm.

5. The construction material according to claim 1, wherein the particles having a diameter smaller than or equal to 150 µm contain at least 30% of $Al_2O_3$.

6. The construction material according to claim 1, wherein the particles having a diameter smaller than or equal to 150 µm contain at most 50% of CaO.

7. The construction material according to claim 6, wherein the particles having a diameter smaller than or equal to 150 µm contain from 1% to 50% of CaO.

8. The construction material according to claim 1, wherein the $SiO_2/Al_2O_3$ weight ratio being less than 1.

9. The construction material according to claim 1, wherein the particles having a diameter smaller than or equal to 150 µm contain at least 10% of $SiO_2$.

10. The construction material according to claim 1, wherein the particles having a diameter smaller than or equal to 150 µm further contain up to 20% of $Fe_2O_3$.

11. The construction material according to claim 1, wherein the particles having a diameter smaller than or equal to 150 µm further contain up to 5% of $TiO_2$.

12. A pozzolanic material or geopolymer precursor for the preparation of a construction material according to claim 1, comprising:
    from 10% to 95% of $Al_2O_3$;
    from 5% to 50% of $SiO_2$;
    from 0% to 35% of CaO;
    from 0% to 25% of $Fe_2O_3$; and
    from 0% to 8% of $TiO_2$.

13. The pozzolanic material or geopolymer precursor according to claim 12, wherein the pozzolanic material is a calcined bauxite.

14. A construction material in the form of a powder containing at least 1.5% of CaO and in which 1% to 80% of the particles having a diameter smaller than or equal to 150 µm contain:
    at least 25% of $Al_2O_3$;
    less than 60% of CaO; and
    at least 5% of $SiO_2$, the $SiO_2/Al_2O_3$ weight ratio being less than 1.2;
wherein the construction material in the form of a powder comprises Portland cement and calcined bauxite.

* * * * *